(12) United States Patent
Shih et al.

(10) Patent No.: US 12,304,643 B2
(45) Date of Patent: May 20, 2025

(54) PARACHUTE LANDING METHODS AND SYSTEMS FOR AN UNMANNED AERIAL VEHICLE

(71) Applicant: GEOSAT Aerospace & Technology, Tainan (TW)

(72) Inventors: Lung-Shun Shih, Huatan Township (TW); Fu-Kai Yang, Tainan (TW); Yi-Feng Cheng, Tainan (TW); Di-Yang Wang, Taipei (TW); Chien-Hsun Liao, Taichung (TW)

(73) Assignee: GEOSAT AEROSPACE & TECHNOLOGY, Tainan (TW)

( * ) Notice: Subject to any disclaimer, the term of this patent is extended or adjusted under 35 U.S.C. 154(b) by 51 days.

(21) Appl. No.: 18/394,135

(22) Filed: Dec. 22, 2023

(65) Prior Publication Data
US 2024/0174367 A1 May 30, 2024

Related U.S. Application Data

(63) Continuation of application No. 16/243,069, filed on Jan. 8, 2019, now Pat. No. 11,884,406.
(Continued)

(51) Int. Cl.
| | |
|---|---|
| *B64U 70/83* | (2023.01) |
| *B64D 17/62* | (2006.01) |
| *B64U 10/25* | (2023.01) |
| *G05D 1/00* | (2006.01) |
| *G05D 1/223* | (2024.01) |

(Continued)

(52) U.S. Cl.
CPC ............ *B64D 17/62* (2013.01); *B64U 10/25* (2023.01); *B64U 70/83* (2023.01); *G05D 1/0011* (2013.01); *G05D 1/0094* (2013.01); *G05D 1/0202* (2013.01); *G05D 1/12* (2013.01); *G05D 1/223* (2024.01); *G05D 1/686* (2024.01); *G05D 1/689* (2024.01); *G05D 1/692* (2024.01);
(Continued)

(58) Field of Classification Search
CPC ........ B64D 17/62; B64D 17/80; B64D 45/04; G05D 1/0011; G05D 1/0044; G05D 1/0094; G05D 1/0202; G05D 1/12; G05D 1/223; G05D 1/686; G05D 1/689; G05D 1/692; B64U 10/25; B64U 2101/30; B64U 2201/104; B64U 2201/20; B64U 70/83
See application file for complete search history.

(56) References Cited

U.S. PATENT DOCUMENTS

| | | |
|---|---|---|
| 5,009,374 A | 4/1991 | Manfredi et al. |
| 2003/0057327 A1 | 3/2003 | Carroll |

(Continued)

*Primary Examiner* — Matthew J. Reda
(74) *Attorney, Agent, or Firm* — McClure, Qualey & Rodack, LLP

(57) ABSTRACT

The present application provides a system for unmanned aerial vehicle (UAV) parachute landing. An exemplary system includes a detector configured to detect at least one of a flight speed, a wind speed, a wind direction, a position, a height, and a voltage of a UAV. The system also includes a memory storing instructions and a processor configured to execute the instructions to cause the system to: determine whether to open a parachute of the UAV in accordance with a criterion, responsive to the determination to open the parachute of the UAV, stop a motor of the UAV that spins a propeller of the UAV, and open the parachute of the UAV after stopping the motor of the UAV for a first period.

19 Claims, 16 Drawing Sheets

Related U.S. Application Data

(60) Provisional application No. 62/614,925, filed on Jan. 8, 2018, provisional application No. 62/614,933, filed on Jan. 8, 2018.

(51) Int. Cl.
  *G05D 1/686* (2024.01)
  *G05D 1/689* (2024.01)
  *G05D 1/692* (2024.01)
  *B64U 101/30* (2023.01)

(52) U.S. Cl.
  CPC .... *B64U 2101/30* (2023.01); *B64U 2201/104* (2023.01); *B64U 2201/20* (2023.01)

(56) References Cited

U.S. PATENT DOCUMENTS

| | | |
|---|---|---|
| 2005/0090945 A1* | 4/2005 | Bodin .................. G05D 1/0044 701/2 |
| 2009/0026319 A1 | 1/2009 | Strong |
| 2014/0379173 A1 | 12/2014 | Knapp et al. |
| 2016/0009392 A1 | 1/2016 | Korhonen et al. |
| 2016/0200415 A1 | 7/2016 | Cooper |
| 2016/0340049 A1 | 11/2016 | Ferreyra et al. |
| 2016/0347462 A1* | 12/2016 | Clark .................... B64D 17/62 |
| 2016/0367905 A1 | 12/2016 | Huang et al. |
| 2017/0057635 A1 | 3/2017 | Strayer |
| 2017/0158338 A1* | 6/2017 | Sweeny ................ B64U 70/83 |
| 2017/0251193 A1 | 8/2017 | Zhou et al. |
| 2018/0039271 A1 | 2/2018 | Rimoux et al. |
| 2018/0067498 A1 | 3/2018 | Wang et al. |
| 2018/0218533 A1 | 8/2018 | Millin et al. |
| 2018/0327091 A1 | 11/2018 | Burks et al. |
| 2019/0060679 A1 | 2/2019 | Kim et al. |
| 2020/0070999 A1 | 3/2020 | Dubois et al. |
| 2020/0108931 A1 | 4/2020 | Zhou |

* cited by examiner

PARACHUTE LANDING METHODS AND SYSTEMS FOR AN UNMANNED AERIAL VEHICLE

CROSS REFERENCE TO RELATED APPLICATION

The present application is a continuation of U.S. application Ser. No. 16/243,069, filed Jan. 8, 2019, which claims the benefit of priority to United States Provisional Application Nos. 62/614,925 and 62/614,933, both filed on Jan. 8, 2018. The entire contents of all the aforementioned applications are incorporated herein by reference.

TECHNICAL FIELD

The present application relates to unmanned aerial vehicles (UAVs), and more particularly, to parachute landing methods and systems for UAVs.

BACKGROUND

A conventional UAV may land by wheels or belly. The wheels may add weight to the UAV and may be unfavorable components for a UAV used for a longer duration flight. Landing by belly may require extra protection at the UAV's belly. The protection may also add weight to the UAV. However, when the UAV is intended to fly on a mission over a long period of time, the weight of the UAV may become one of critical requirements. It would be desirable to have new landing methods and systems for the UAV that are both safe and do not add too much extra weight.

A conventional ground control system (GCS) may monitor the status of a UAV and may control the UAV to execute a mission, such as taking aerial images over an area of interest. However, it may still rely on a user to control the UAV in accordance with his experience and training. In order to use the UAVs in different applications, users of these UAVs may require application-specific training and experience. For example, if a user plans to land the UAV at an open space, accurate and user friendly landing methods and systems may be demanded. It would be desirable to have user-friendly GCS for flight safety and easy landing.

SUMMARY

Embodiments of the present disclosure provide improved methods and systems for memory management of kernel and user spaces in computers, apparatuses, or systems.

In at least one embodiment, an exemplary system for UAV parachute landing includes a detector configured to detect at least one of a flight speed, a wind speed, a wind direction, a position, a height, and a voltage of a UAV. The exemplary system also includes a memory storing instructions and a processor configured to execute the instructions to cause the system to: determine whether to open a parachute of the UAV in accordance with a criterion, responsive to the determination to open the parachute of the UAV, stop a motor of the UAV that spins a propeller of the UAV, and open the parachute of the UAV after stopping the motor of the UAV for a first period.

Also disclosed herein are non-transitory computer-readable mediums storing a set of instructions that are executable by one or more processors of an apparatus to cause the apparatus to perform exemplary methods for UAV parachute landing. The exemplary methods include obtaining an operation mode of a UAV, determining whether to open a parachute of the UAV in accordance with a criterion, responsive to the determination to open the parachute of the UAV, stopping a motor of the UAV that spins a propeller of the UAV, and opening the parachute of the UAV after stopping the motor of the UAV for a period.

Further disclosed herein are methods for UAV parachute landing. Exemplary methods include obtaining an operation mode of a UAV, determining whether to open a parachute of the UAV in accordance with a criterion, responsive to the determination to open the parachute of the UAV, stopping a motor of the UAV that spins a propeller of the UAV, and opening the parachute of the UAV after stopping the motor of the UAV for a period.

In addition, embodiments disclosed herein are directed to GCSs for UAV parachute landing. Exemplary GCSs include a memory storing instructions and a processor configured to execute the instructions to cause the GCS to: receive a home point for the UAV, display the home point on a map, and transmit the home point to the UAV, receive a landing point of the UAV, display the landing point on the map, and transmit the landing point to the UAV, receive a height for landing, display the height for landing on a screen, and transmit the height for landing to the UAV, receive a radius for the landing point, display the radius for the landing point on the screen, and transmit the radius to the UAV, receive a signal to open the parachute and transmit the signal to the UAV, or any combination thereof.

It is to be understood that the foregoing general description and the following detailed description are exemplary and explanatory only, and are not restrictive of the invention, as claimed.

BRIEF DESCRIPTION OF THE DRAWINGS

Reference will now be made to the accompanying drawings showing exemplary embodiments of this disclosure. In the drawings.

DETAILED DESCRIPTION

Reference will now be made in detail to exemplary embodiments, examples of which are illustrated in the accompanying drawings. The following description refers to the accompanying drawings in which the same numbers in different drawings represent the same or similar elements unless otherwise represented. The implementations set forth in the following description of exemplary embodiments do not represent all implementations consistent with the invention. Instead, they are merely examples of apparatuses and methods consistent with aspects related to the invention as recited in the appended claims.

Figure 1:
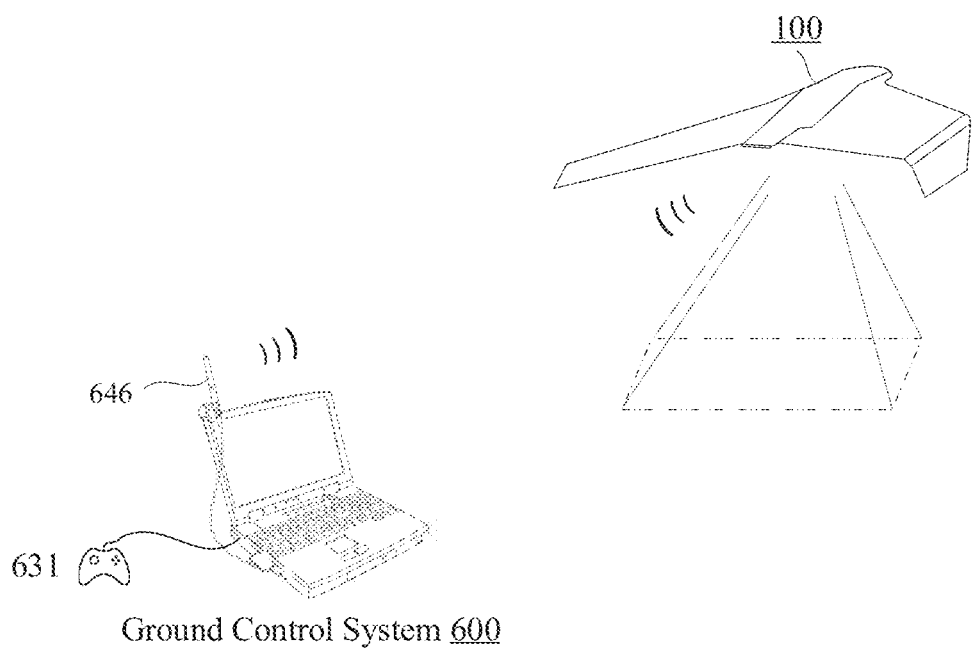
FIG. 1 is a schematic diagram of an exemplary UAV and an exemplary GCS and an exemplary remote controller for controlling the UAV, according to some embodiments of the present disclosure.

FIG. 1 is a schematic diagram of an exemplary UAV 100, an exemplary GCS 600 and an exemplary remote controller 631 for controlling UAV 100, according to some embodiments of the present disclosure. After UAV 100 is launched successfully, a user can control UAV 100 through GCS 600 and/or remote controller 631. GCS 600 can operate on a desktop computer, a laptop, a tablet, or a smartphone. The user can input an instruction on GCS 600 to control or set a parameter on UAV 100. After receiving the instruction or the parameter, GCS 600 is configured to transmit a signal through an antenna 646 to UAV 100 to convey the corresponding instruction.

Alternatively, the user can use remote controller 631 to manually control UAV 100. For example, the user may input an instruction to remote controller 631 to control or set a parameter on UAV 100. After receiving the instruction, remote controller 631 sends a control signal to GCS 600, and GCS 600 then transmits a signal through antenna 646 to UAV 100. Remote controller 631 provides the user a direct and responsive input method to interact with GCS 600 and control UAV 100 accordingly.

Figure 2:
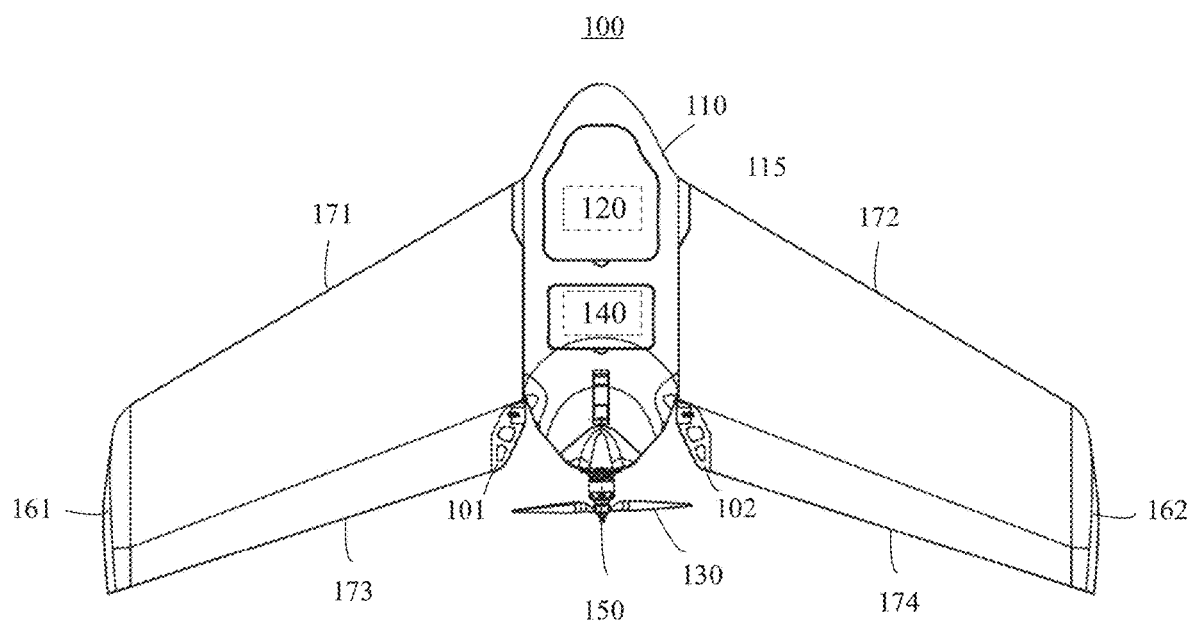
FIG. 2 is a top view of an exemplary UAV, according to some embodiments of the present disclosure.

FIG. 2 is a top view of exemplary UAV 100, according to some embodiments of the present disclosure. UAV 100 includes a UAV body assembly 110, a flight control system (FCS) 120, a payload 140, a left wing 171 and a right wing 172, a left aileron 173 and a right aileron 174, a left winglet 161 and a right winglet 162, a left aileron controller 101 and a right aileron controller 102, a motor 150, and a propeller 130. Payload 140 may comprise a camera, a multispectral camera, a thermal infrared camera, or other camera is similar capabilities. FCS 120 is coupled to UAV body assembly 110. Motor 150 is coupled to UAV body assembly 110 at one end and coupled to propeller 130 at the other end. FCS 120 is communicatively connected to motor 150. FCS 120 may be configured to control left aileron 173 and right aileron 174 by servo motors connected to left aileron controller 101 and right aileron controller 102, respectively.

Figure 3:
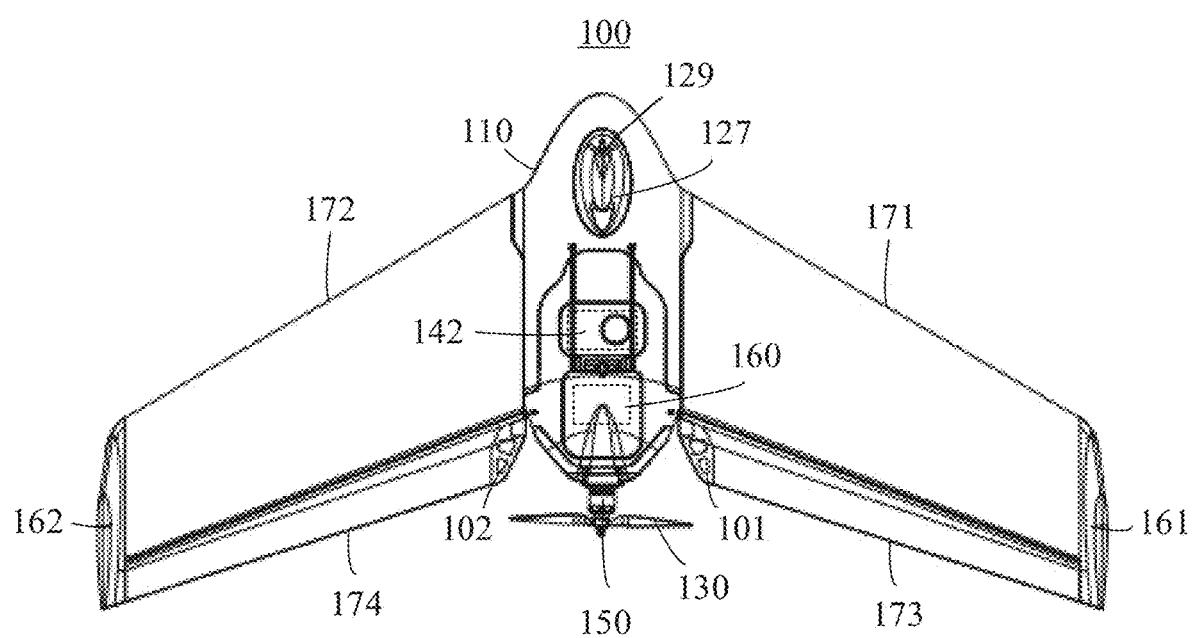
FIG. 3 is a bottom view of an exemplary UAV, according to some embodiments of the present disclosure.

FIG. 3 is a bottom view of exemplary UAV 100, according to some embodiments of the present disclosure. UAV 100 includes UAV body assembly 110, left wing 171 and right wing 172, left aileron 173 and right aileron 174, left winglet 161 and right winglet 162, left aileron controller 101 and right aileron controller 102, motor 150, propeller 130, a hook 127, a pitot tube 129, payload 140, and a parachute 160. Pitot tube 129 is coupled to UAV body assembly 110. Hook 127 is coupled to UAV body assembly 110 beneath FCS 120. Hook 127 is for use of launching UAV 100 from a launch rack. Pitot tube 120 may be integrated together with hook 127, which may reduce wind resistance.

Figure 4:
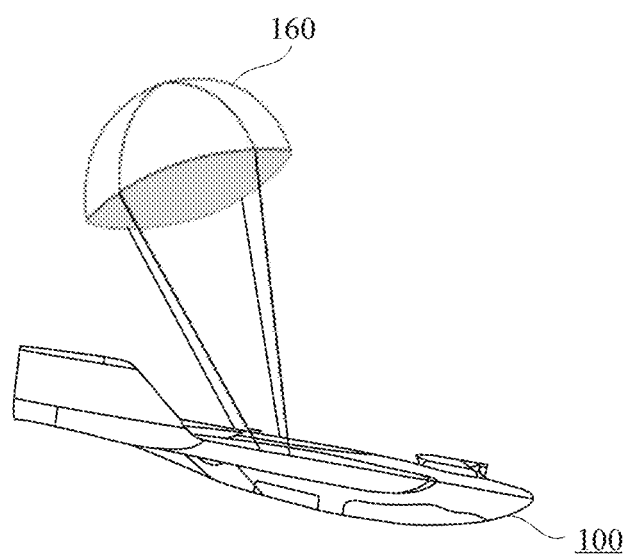
FIG. 4 is a schematic diagram of exemplary UAV parachute landing, according to some embodiments of the present disclosure.

FIG. 4 is a schematic diagram of exemplary UAV parachute landing, according to some embodiments of the present disclosure. As shown in FIG. 4, for example, when UAV 100 finishes a flight mission, UAV 100 may fly to a landing point and open parachute 160 of UAV 100 for landing. Since parachute 160 is installed at the bottom of UAV 100, UAV 100 becomes upside down when parachute 160 is open for landing. In other words, UVA 100 lands by its upper side of body assembly 110, thereby protecting payload 140 from crash or contamination.

Figure 5:
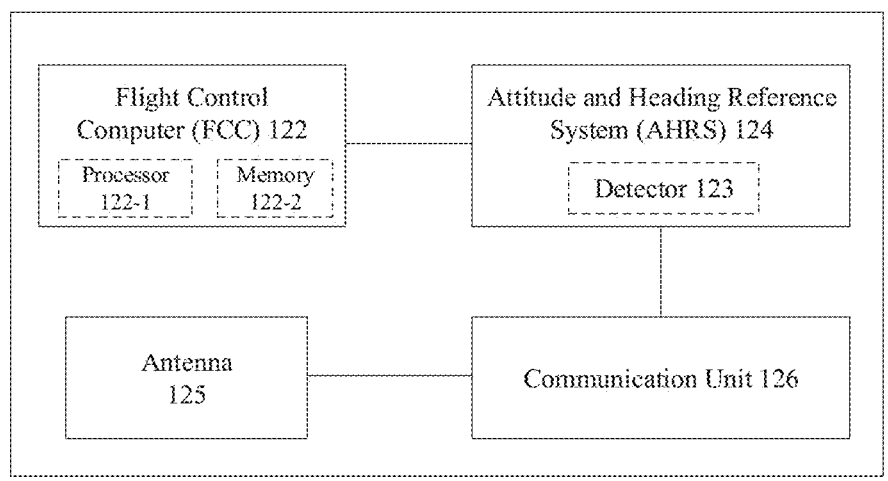
FIG. 5 is a schematic diagram of an exemplary flight control system for UAV parachute landing, according to some embodiments of the present disclosure.

FIG. 5 is a schematic diagram of exemplary FCS 120 for UAV parachute landing, according to some embodiments of the present disclosure. As shown in FIG. 5, FCS 120 includes a flight control computer (FCC) 122, an Attitude and Heading Reference System (AHRS) 124, a communication unit 126, an antenna 125 for controlling UAV 100, according to some embodiments of the present disclosure. AHRS 124 includes at least one detector 123.

As shown in FIG. 5, AHRS 124 includes at least one detector 123 that provides attitude information for UAV 100, including roll, pitch, and yaw. Detectors 123 may comprise one or more sensors. These sensors may also be referred to as magnetic, angular rate, and gravity (MARG) sensors, and include either solid-state or microelectromechanical systems (MEMS) gyroscopes, accelerometers, and magnetometers. Accordingly, detector 123 can be configured to detect, for example, a flight speed, a wind speed, a wind direction, a position, a height, or a voltage of UAV 100.

AHRS 124 can also include an on-board processing system which provides attitude and heading information. In some embodiments, AHRS 124 may provide attitude determination of UAV 100, and form part of an inertial navigation system of UAV 100.

FCC 122 includes a processor 122-1 and a memory 122-2 storing instructions. FCC 122 is configured to control UAV 100 for parachute landing. For example, processor 122-1 of FCC 122 is configured to execute the instructions stored in memory 122-2 to cause FCS 120 to determine whether to open parachute 160 of UAV 100 in accordance with a criterion. If the criterion is met, processor 122-1 of FCC 122 is configured to execute the instructions to cause FCS 120 to determine to open parachute 160 for landing.

The criterion can be that UAV 100 receives a signal to open parachute 160 from GCS 600. For example, the user inputs an instruction for landing in GCS 600, and therefore GCS sends a signal to ask UAV 100 to open parachute 160 for landing. Alternatively, the criterion can be that UAV 100 arrives at a predetermined landing position and a predetermined landing height. For example, the user may set a landing point in front of the user and a landing height at 40 meters. When UAV 100 completes its mission, UAV 100 flies to the landing point and reduces its height to 40 meters. Once UAV 100 arrives the landing point at the height of 40 meters, FCS 120 is configured to open parachute 160 for landing.

The criterion can also be that a voltage of UAV 100 is equal to or lower than a predetermined voltage. For example, when the voltage of UAV 100 is equal to or lower than 10.8 volts, FCS 120 is configured to open parachute 160 for landing. The criterion can further be that UAV 100 does not receive a signal of a Globe Positioning System (GPS) for another period. The period can be, for example, 30 seconds. For example, when UAV 100 accidentally flies into a building for 30 seconds, FCS 120 is configured to open parachute 160 for landing. Moreover, the criterion can be that UAV 100 flies around an area for a period. For example, when UAV 100 is trapped in an area, FCS 120 is configured to open parachute 160 for landing.

In response to the determination to open parachute of the UAV, processor 122-1 of FCC 122 is configured to execute the instructions to cause FCS 120 to stop motor 150 of UAV 100 that spins propeller 130. After stopping motor 150 of UAV 100 for a period, processor 122-1 of FCC 122 is configured to execute the instructions to cause FCS 120 to open parachute 160 for landing. For example, processor 122-1 may be configured to activate a servo to open a cover of parachute 160 in order to open it.

In some embodiments, processor 122-1 of FCC 122 is configured to execute the instructions to cause FCS 120 to determine the criterion that the UAV arrives at the predetermined landing position and predetermined landing height is met by determining whether the UAV passes the predetermined landing position at a predetermined landing height. In response to a determination that the UAV passes the predetermined landing position at the predetermined landing height, processor 122-1 of FCC 122 is configured to execute the instructions to cause FCS 120 to open parachute 160. In response to a determination that the UAV does not pass the predetermined landing position at the predetermined landing height, processor 122-1 of FCC 122 is configured to execute the instructions to cause FCS 120 to control the UAV to fly around the predetermined landing position to re-enter the predetermined landing position at the predetermined landing height.

In some embodiments, processor 122-1 of FCC 122 is configured to execute the instructions to cause FCS 120 to control the UAV to fly around the predetermined landing position in a circle. Therefore, the predetermined landing position may be on the circumference of the circle. In some embodiments, the predetermined landing position may be the center of the circle.

In response to the determination to open parachute 160 of UAV, processor 122-1 is configured to execute the instructions to cause the system to stop motor 150 by determining to stop motor 150 at the position in accordance with a wind direction and a wind speed and stopping motor 150 accordingly. Alternatively, processor 122-1 is configured to execute the instructions to cause FCS 120 to stop motor 150 when UAV 100 flies against the wind.

Alternatively, in response to the determination to open parachute 160, processor 122-1 may be configured to execute the instructions to cause FCS 120 to reduce a height of UAV 100 to a predetermined height before stopping motor 150 at the predetermined height. For example, FCS 120 may be configured to reduce the height of UAV 100 to 40 meters before stopping motor 150.

In some embodiments, processor 122-1 is configured to execute the instructions to cause FCS 120 to brake propeller 130 after stopping motor 150. A size of parachute 160 is associated with a weight of UAV 100.

Processor 122-1 is also configured to execute the instructions to cause FCS 120 to receive a home position set by the user for UAV 100 from GCS 600, receive a landing position set by the user for UAV 100 from GCS 600, receive a landing height set by the user for UAV 100 from GCS 600, receive a radius of a circle set by the user for the home point of UAV 100 from GCS 600, and/or receive another radius of a circle set by the user for the landing point of UAV 100 from GCS 600. The home position of UAV 100 may fall at the center of the circle. The landing position of UAV 100 may fall on the circumference of another circle. The radius can be, for example, 40, 50, or 60 meters. Another radius can be for example, 30, 40, 50, or 60 meters.

Processor 122-1 of FCC 122 may also be configured to execute the instructions to cause FCS 120 to obtain an operation mode of UAV 100. The operation mode of UAV 100 includes, for example, a mission mode, an auto-photo mode, a pilot-control mode, a landing mode, and a launch mode.

In some embodiments, when the operation mode of UAV 100 is the mission mode, processor 122-1 of FCC 122 is configured to execute the instructions to cause FCS 120 to control UAV 100 to fly to the home point after UAV 100 completes a route in the mission mode.

Alternatively, when UAV 100 does not receive a signal of data link from GCS 600 for a period in the mission mode, processor 122-1 of FCC 122 is configured to execute the instructions to cause FCS 120 to control UAV to fly to the home point.

In some embodiments, when the operation mode of UAV 100 is an auto-photo mode, processor 122-1 of FCC 122 is configured to execute the instructions to cause FCS 120 to control UAV 100 to enter a landing mode after the UAV takes a plurality of photographs over a predetermined area in the auto-photo mode. One of the plurality of photographs is, for example, 20% overlap with another of the plurality of photographs. Those overlapped regions are used to align photographs to combine them into a large photograph.

Moreover, a number of the plurality of photographs may be associated with at least one of a height of UAV 100 when the UAV takes the plurality of photographs, a focal length of a camera on UAV 100, a required overlapping region between two of the plurality of the photographs, or a flight speed of UAV 100. When UAV 100 takes photographs from a higher height, processor 122-1 of FCC 122 is configured to execute the instructions to cause FCS 120 to drive a camera to take photographs at a slower rate, and therefore a lower number of photographs. In contrast, when UAV 100 takes photographs from a lower height, processor 122-1 of FCC 122 is configured to execute the instructions to cause FCS 120 to drive a camera to take photographs at a higher rate, and as a result with more photographs.

When UAV 100 takes photographs using a camera using lenses of long focal lengths, processor 122-1 of FCC 122 is configured to execute the instructions to cause FCS 120 to drive a camera to take photographs at a faster rate, and therefore a larger number of photographs. In contrast, when UAV 100 takes photographs using a camera using lenses of short focal lengths, processor 122-1 of FCC 122 is configured to execute the instructions to cause FCS 120 to drive a camera to take photographs at a lower rate, and therefore a lower number of photographs.

When UAV 100 takes photographs requiring larger overlapping region between two of the plurality of the photographs, processor 122-1 of FCC 122 is configured to execute the instructions to cause FCS 120 to drive a camera to take photographs at a faster rate, and therefore a larger number of photographs. In contrast, when UAV 100 takes photographs requiring less overlapping region between two of the plurality of the photographs, processor 122-1 of FCC 122 is configured to execute the instructions to cause FCS 120 to drive a camera to take photographs at a lower rate, and therefore a lower number of photographs.

When UAV 100 takes photographs at a fast flight speed of UAV 100, processor 122-1 of FCC 122 is configured to execute the instructions to cause FCS 120 to drive a camera to take photographs at a faster rate, and therefore a larger number of photographs. In contrast, when UAV 100 takes photographs at a slow flight speed of UAV 100, processor 122-1 of FCC 122 is configured to execute the instructions to cause FCS 120 to drive a camera to take photographs at a lower rate, and therefore a lower number of photographs.

Communication unit 126 may include a modem for transmitting and receiving radio frequency signals through antenna 125 and communicating with GCS 600. Communication unit 126 can include one or more cellular communication modules, including, for example, an IEEE 802.11, a fifth generation (5G) radio system, a Long-Term Evolution (LTE), a High Speed Packet Access (HSPA), a Wideband Code-Division Multiple Access (WCDMA), and/or a Global System for Mobile communication (GSM) communication module. UAV 100 can be configured to communicate with GCS 600 through communication unit 126 and antenna 125. Communication unit 126 may also include a global positioning system (GPS) receiver. Accordingly, UAV 100 can receive positioning information through the GPS receiver of communication unit 126.

Communication unit 126 may include any appropriate type of hardware, such as integrated circuits and field programmable gate arrays, or software, such as a set of instructions, a subroutine, or a function (i.e. a functional program) executable on a processor or controller, to carry out the following communication operations. Communication unit 126 includes modulation and demodulation subunits (i.e., a modem) that modulate and demodulate electric or radio signals for data transmission and reception. For example, communication unit 126 may include a Wi-Fi modem that transmits and receives data to and from GCS 600 through a Wi-Fi Direct technology. As another example, communication unit 126 includes a long-term evolution (LTE) modem that transmits and receives data to and from GCS 600 through an LTE Device-to-Device technology. In certain applications, communication unit 126 may employ infrared technology.

Figure 6:
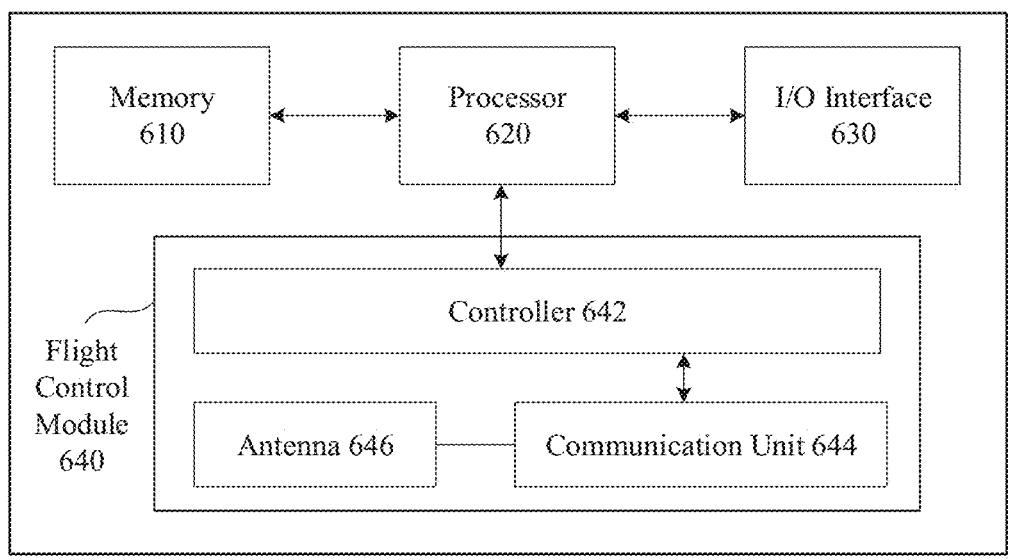
FIG. 6 is a block diagram of an exemplary GCS for UAV parachute landing, according to some embodiments of the present disclosure.

FIG. 6 is a block diagram of an exemplary GCS 600 for UAV parachute landing, according to some embodiments of the present disclosure. GCS 600 includes a memory 610, a processor 620, an I/O interface 630, and a flight control module 640. Fight control module 640 includes a controller 642, a communication unit 644, and an antenna 646. One or more of these units of GCS 600 may be included in GCS 600 for controlling UAV 100. These units may be configured to transfer data and send or receive instructions between or among each other.

Processor 620 includes any appropriate type of general-purpose or special-purpose microprocessor, digital signal processor, or microcontroller. Processor 620 can be one of processors in a computer. Memory 610 may include any appropriate type of storage provided to store any type of information that processor 620 may need to operate. Memory 610 may be a volatile or non-volatile, magnetic, semiconductor, tape, optical, removable, non-removable, or other type of storage device or tangible (e.g., non-transitory) computer-readable medium including, but not limited to, a read-only memory (ROM), a flash memory, a dynamic random-access memory (RAM), and a static RAM. Memory 610 may be configured to store one or more programs or instructions for execution by processor 620 to control UAV 100, as disclosed herein. Processor 620 can be configured to cause GCS 600 as the GCS described above for FIGS. 1-5.

For example, processor 620 may be configured to execute the instructions stored in memory 610 to cause GCS 600 to receive a home point for UAV 100 set by the user, display the home point on a map, and transmit the home point to UAV 100. Alternatively, processor 620 can be configured to execute the instructions stored in memory 610 to cause GCS 600 to receive a landing point of UAV 100, display the landing point on the map, and transmit the landing point to UAV 100. Moreover, processor 620 can also be configured to execute the instructions stored in memory 610 to cause GCS 600 to receive a height for landing, display the height for landing on a screen, and transmit the height for landing to UAV 100. In at least one embodiments, processor 620 is configured to execute the instructions stored in memory 610 to cause GCS 600 to receive a radius for the landing point, display the radius for the landing point on the screen, and transmit the radius to UAV 100. In at least another embodiment, processor 620 may be configured to execute the instructions stored in memory 610 to cause GCS 600 to receive a signal to open parachute 160 and transmit the signal to UAV 100.

In some embodiments, processor 620 is configured to execute the instructions stored in memory 610 to cause GCS 600 to receive one or more points in a mission mode, display the one or more points on the map, schedule a flight route in accordance with the one or more points, and transmit the one or more points and the flight route to UAV 100. In addition, processor 620 can also be configured to execute the instructions stored in memory 610 to cause GCS 600 to receive a starting point and an ending point in an auto-photo mode, display the starting point and the ending point on the map, schedule a plurality of routes over an area in accordance with the starting point and the ending point, and transmit the plurality of routes and the starting point and the ending point to UAV 100.

Memory 610 may be further configured to store information and data used by processor 620. For instance, memory 610 can be configured to store a home point, a landing point, previous routes, previous missions, photographs, and location information associated with photographs.

I/O interface 630 can be configured to communicate with other apparatuses. For example, I/O interface 630 may receive a signal from another apparatus (e.g., a computer) including system configuration for GCS 600. I/O interface 630 may also output data of flight routes and photographs.

Controller 642 includes any appropriate type of general-purpose or special-purpose microprocessor, digital signal processor, or microcontroller. Controller 642 is configured to execute instructions to cause flight control module 640 to communicate with FCS 120 through communication unit 644 and antenna 646.

Communication unit 644 can include one or more cellular communication modules, including, for example, an IEEE 802.11, a fifth generation (5G) radio system, a Long-Term Evolution (LTE), a High Speed Packet Access (HSPA), a Wideband Code-Division Multiple Access (WCDMA), and/or a Global System for Mobile communication (GSM) communication module. GCS 600 can communicate with UAV 100 through communication unit 644 and antenna 646.

Communication unit 644 may also include a global positioning system (GPS) receiver. Accordingly, GCS 600 can receive positioning information through the GPS receiver of communication unit 644.

Figure 7:
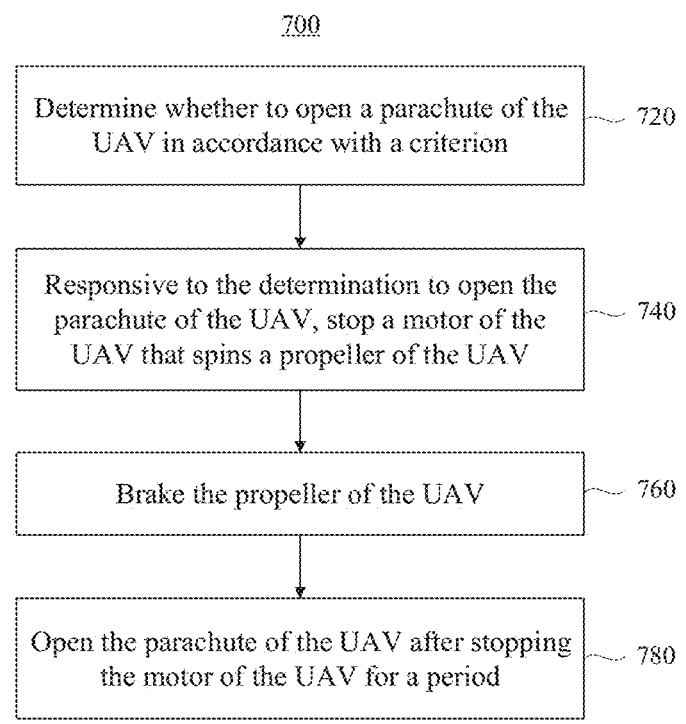
FIG. 7 is a schematic diagram of an exemplary method for UAV parachute landing, according to some embodiments of the present disclosure.

FIG. 7 is a schematic diagram of an exemplary method 700 for UAV parachute landing, according to some embodiments of the present disclosure. Method 700 may be performed by, for example, FCC 122 of UAV 100. A processor of FCC 122 may be configured to execute instructions to perform method 700, as illustrated below. Method 700 includes determining whether to open the parachute of the UAV in accordance with a criterion (step 720), responsive to a determination to open a parachute of the UAV, stopping a motor of the UAV that spins a propeller of the UAV (step 740), braking the propeller of the UAV (step 760), and opening the parachute of the UAV after stopping the motor of the UAV for a period (step 780).

Step 720 includes determining whether to open a parachute of the UAV in accordance with a criterion. For example, when a criterion is met, FCC 122 is configured to determine to open parachute 160 of UAV 100.

The criterion may include that UAV 100 receives a signal to open parachute 160 from GCS 600. For example, a user may input an instruction to open parachute 160 of UAV 100 on GCS 600. After GCS 600 receives the instruction, GCS 600 is configured to send a signal to open parachute 160 to UAV 100 through communication unit 644. FCC 122 may be configured to determine to open parachute 160 of UAV 100 when receiving the signal to open parachute 160 from GCS 600.

Alternatively, the criterion may include that UAV 100 receives a signal to open parachute 160 from remote controller 631. For example, a user may input an instruction to open parachute 160 by remote controller 631. After remote controller 631 receives the instruction, remote controller 631 is configured to send a signal to open parachute 160 to UAV 100 through GCS 600. FCC 122 is configured to determine to open parachute 160 of UAV 100 when receiving the signal to open parachute 160.

In some embodiments, the criterion may include that UAV 100 arrives at a position. For example, after completing a flight mission, UAV 100 flies to a predetermined landing point. After UAV 100 arrives at the set landing point, FCC 122 may be configured to determine to open parachute 160 of UAV 100. As another example, FCC may be configured to detect that UAV 100 arrives at a position within 5 meters from the landing point, then FCC may be configured to determine that UAV 100 already flies to the landing point. Accordingly, FCC 122 may be configured to determine to open parachute 160 of UAV 100. The above landing point may be set by GCS 600 before UAV 100 takes off. In some embodiments, the above landing point can be a landing point set by GCS 600 after UAV 100 takes off. For example, GCS 600 may transmit a new landing point to UAV 100 through communication unit 644.

After completing a flight mission, UAV 100 can also fly back to a home point when no landing point is set. After UAV 100 arrives at the home point, FCC 122 may be configured to determine to open parachute 160. The above home point may be set by GCS 600 before UAV 100 takes off. In some embodiments, the above home point can be a home point set by GCS 600 after UAV 100 takes off. For example, GCS 600 may transmit a new home point to UAV 100 through communication unit 644.

In some embodiments, the criterion may include that the UAV is at a low voltage. For example, FCC 122 may be configured to detect that a battery of UAV 100 is at a low voltage, e.g., 10.8 volts while the battery should have a voltage at around 13.2 volts. After FCC detects that the battery of UAV 100 is at a low voltage, FCC 122 may be configured to determine to open parachute 160 of UAV 100.

Alternatively, the criterion may include that UAV 100 does not receive a signal of Globe Positioning System (GPS) for a period. For example, when FCC 122 is configured to receive the GPS signal from communication unit 644 but does not receive the GPS signal for more than four seconds, FCC 122 may be configured to determine to open parachute 160 of UAV 100.

The criterion can also include that UAV 100 does not receive a signal of data link from GCS 600 for a period of time. For example, when FCC 122 is configured to receive a data link signal from GCS 600, but does not receive the data link signal for more than one minute, FCC 122 may be configured to determine to open parachute 160 of UAV 100. As another example, when FCC 122 is configured to receive the data link signal from GCS 600, but does not receive the data link signal for more than one minute, FCC 122 may be configured to determine to fly back to a set home point or a set landing point and wait for a resumption of the data link. In such a case, if the loss of the data link continues, FCC 122 may be configured to switch to a landing mode that stops motor 150 and opens parachute 160 of UAV 100 after motor 150 is completely stopped.

In some embodiments, the criterion may include a stall of UAV 100. If FCC 122 fails to recover the stall of UAV 100 and a normal flight cannot be resumed in a predetermined period, the altitude of UAV 100 lowers to a threshold height. For example, FCC 122 is configured to detect that a stall where the altitude of UAV 100 lowers to a height of 35 meters in a predetermined period, FCC 122 may be configured to switch to an emergency landing mode to stop motor 150 and open parachute 160 after motor 150 is completely stopped. The threshold height may be within a range of a predetermined height. For example, the threshold height may be within a range of 5 meters above or below the predetermined height of 35 meters.

Alternatively, the criterion may include that UAV 100 flies around an unintended area or UAV 100 is confined in an area in an undesirable manner for a predetermined period. For example, FCC 122 may detect that UAV 100 flies around an unintended area over two minutes, or that UAV 100 is confined by obstructions. To avoid damaging UAV 100 and third party's property and personnel safety, FCC 122 may be configured to switch to an emergency landing mode that stops motor 150 and opens parachute 160 of UAV 100 after motor 150 is completely stopped.

Step 740 includes responsive to a determination to open a parachute of the UAV, stopping a motor of the UAV that spins a propeller of the UAV. For example, FCC 122 may be configured to stop motor 150 that spins propeller 130. As another example, FCC 122 may be configured to stop motor 150 that spins propeller 130 of UAV 100 when UAV 100 flies against the wind. In some embodiments, FCC 122 may be configured to reduce the height of UAV 100 to the height of 35 meters before stopping motor 150 of UAV 100.

Step 760 includes braking the propeller of UAV 100. For example, FCC 122 may be configured to brake propeller 130 by motor 150.

Step 780 includes opening the parachute of the UAV after stopping the motor of the UAV for a first period. For example, FCC 122 may be configured to open parachute 160 of UAV 100 after stopping motor 150 for one second. As another example, FCC 122 may be configured to open parachute 160 of UAV 100 after stopping motor 150 for 0.5 second.

In some embodiments, a size of the parachute of the UAV may be associated with a weight of the UAV. For example, a size of parachute 160 of UAV 100 may be associated with a weight of UAV 100.

Figure 8:
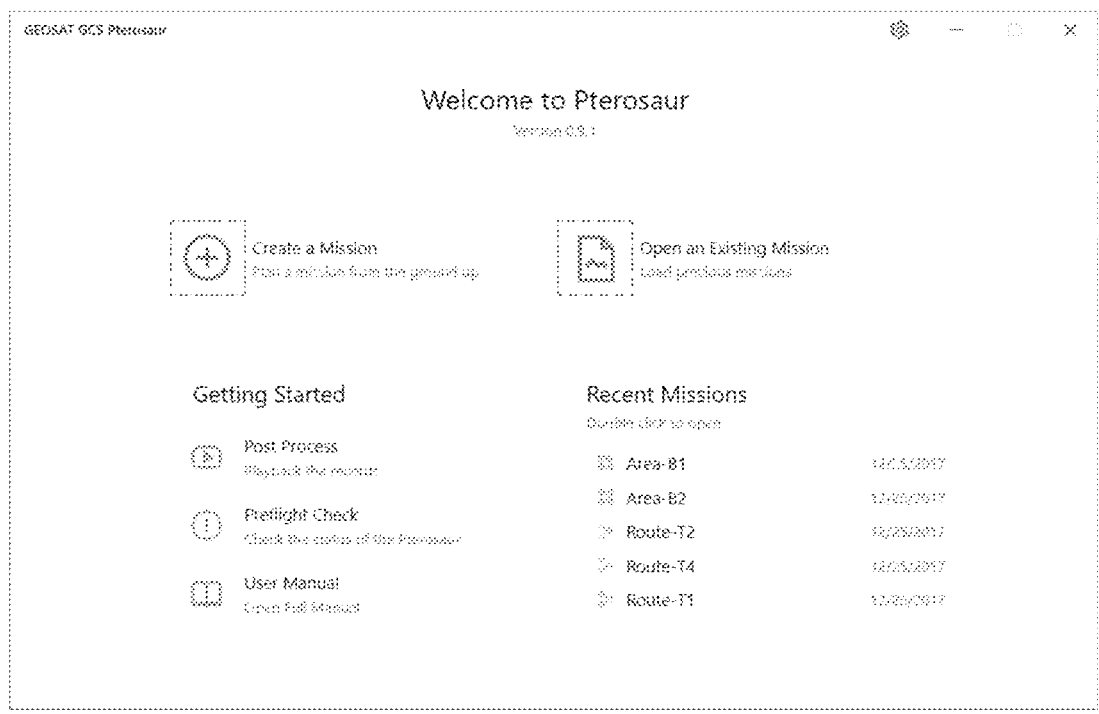
FIG. 8 is a schematic diagram of an exemplary user interface of a GCS for a UAV, according to some embodiments of the present disclosure.

FIG. 8 is a schematic diagram of an exemplary user interface of exemplary GCS 600 for UAV 100, according to some embodiments of the present disclosure. Before launching UAV 100, the user can perform a preflight check by clicking on the Preflight Check icon, as shown in FIG. 8.

Figure 9:
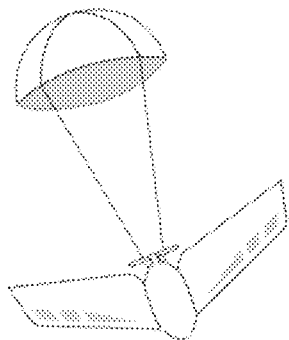
FIG. 9 is a schematic diagram of an exemplary user interface of a GCS for flight check before launching a UAV, according to some embodiments of the present disclosure.

FIG. 9 is a schematic diagram of an exemplary user interface of exemplary GCS 600 for flight check before launching UAV 100, according to some embodiments of the present disclosure. For example, after the user clicks on the Preflight Check icon in FIG. 8, GCS 600 may prompt a preflight check UI for checking a status of parachute 160, as shown in FIG. 9. GCS 600 may be configured to inquire FCC 122 of UAV 100 about the status of parachute 160 and obtain the status of parachute 160 after FCC 122 detects and reports. In some embodiments, the user may follow the instructions, as shown in FIG. 9, to check the status of parachute 160.

Figure 10:
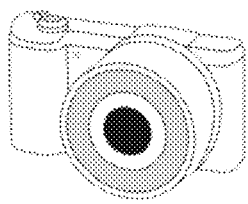
FIG. 10 is a schematic diagram of an exemplary user interface of a GCS for flight check before launching a UAV, according to some embodiments of the present disclosure.

FIG. 10 is a schematic diagram of an exemplary user interface of exemplary GCS 600 for flight check before launching UAV 100, according to some embodiments of the present disclosure. For example, after the user clicks on the Preflight Check icon in FIG. 8, GCS 600 may prompt a preflight check UI for checking the status of payload 140, e.g., a camera, as shown in FIG. 10. GCS 600 may be configured to inquire FCC 122 about the status of the camera and obtain the status of the camera after FCC 122 detects and reports. In some embodiments, the user may follow the instructions, as shown in FIG. 10, to check the status of the camera.

Figure 11:
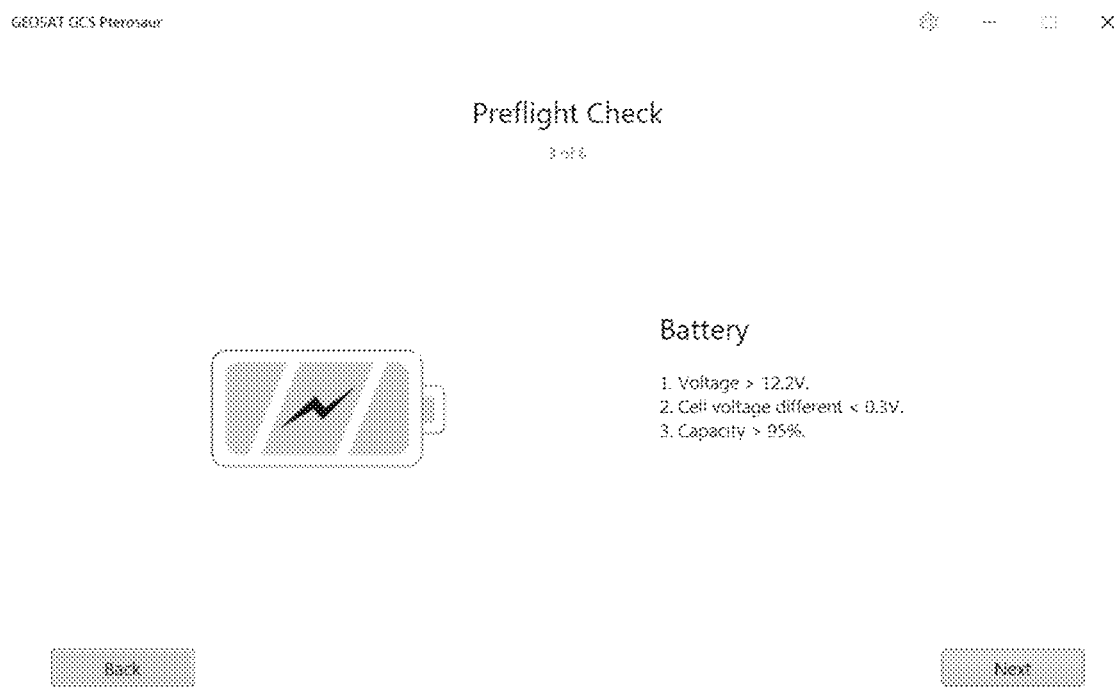
FIG. 11 is a schematic diagram of an exemplary user interface of a GCS for flight check before launching a UAV, according to some embodiments of the present disclosure.

FIG. 11 is a schematic diagram of an exemplary user interface of exemplary GCS 600 for flight check before launching UAV 100, according to some embodiments of the present disclosure. For example, after the user clicks on the Preflight Check icon in FIG. 8, GCS 600 may prompt a preflight check UI for checking the status of a battery of UAV 100, as shown in FIG. 11. GCS 600 may be configured to inquire the status of the battery of UAV 100 and obtain the status of the battery of UAV 100 after FCC 122 detects and reports. In some embodiments, the user may follow the instructions, as shown in FIG. 11, to check the status of the battery of UAV 100.

Figure 12:
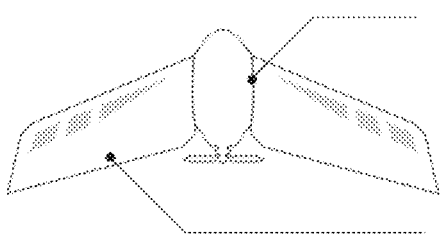
FIG. 12 is a schematic diagram of an exemplary user interface of a GCS for flight check before launching a UAV, according to some embodiments of the present disclosure.

FIG. 12 is a schematic diagram of an exemplary user interface of exemplary GCS 600 for flight check before launching UAV 100, according to some embodiments of the present disclosure. For example, after the user clicks on the Preflight Check icon in FIG. 8, GCS 600 may prompt a preflight check UI for checking the status of the structure of UAV 100, as shown in FIG. 12. GCS 600 may be configured to inquire the status of the structure of UAV 100 and obtain the status of the structure of UAV 100 after FCC 122 detects and reports. In some embodiments, the user may follow the instructions, as shown in FIG. 12, to check the status of the structure of UAV 100.

Figure 13:
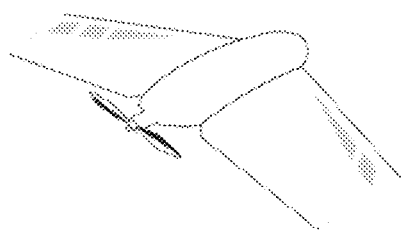
FIG. 13 is a schematic diagram of an exemplary user interface of a GCS for flight check before launching a UAV, according to some embodiments of the present disclosure.

FIG. 13 is a schematic diagram of an exemplary user interface of exemplary GCS 600 for flight check before launching UAV 100, according to some embodiments of the present disclosure. For example, after the user clicks on the Preflight Check icon in FIG. 8, GCS 600 may prompt a preflight check UI for checking the status of ailerons 172 and 174 of UAV 100, as shown in FIG. 13. GCS 600 may be configured to inquire the status of ailerons 173 and 174 of UAV 100 and obtain the status of ailerons 172 and 174 of UAV 100 after FCC 122 detects and reports. In some embodiments, the user may follow the instructions, as shown in FIG. 13, to check the status of ailerons 172 and 174 of UAV 100.

Figure 14:
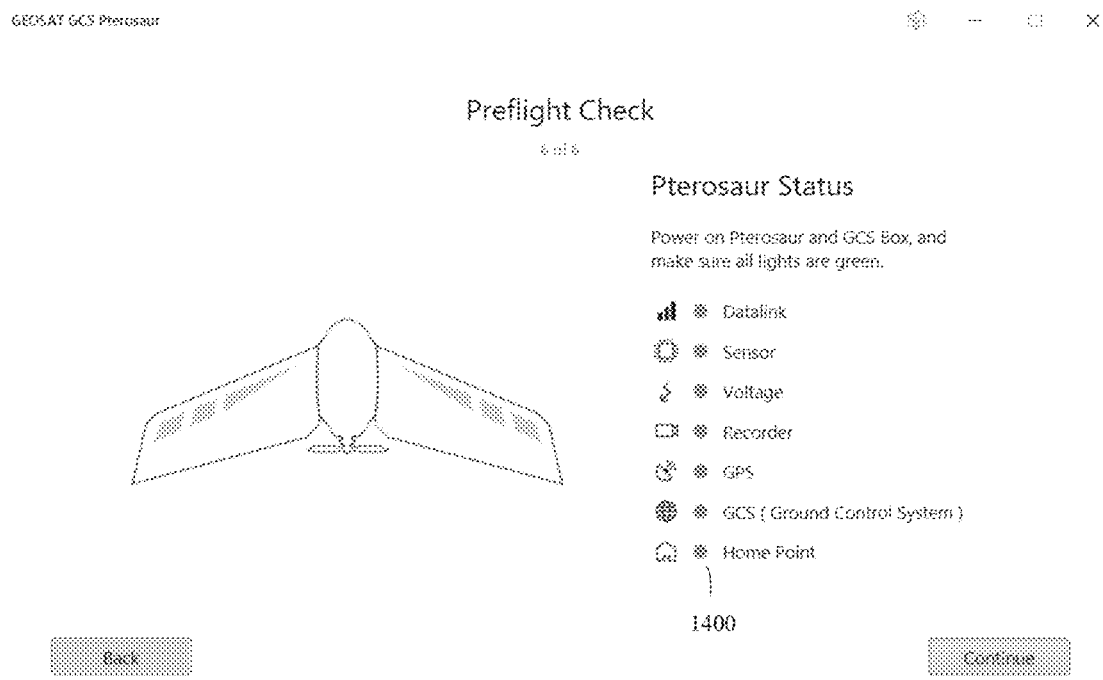
FIG. 14 is a schematic diagram of an exemplary user interface of a GCS for flight check before launching a UAV, according to some embodiments of the present disclosure.

FIG. 14 is a schematic diagram of an exemplary user interface of exemplary GCS 600 for flight check before launching UAV 100, according to some embodiments of the present disclosure. For example, after the user clicks on the Preflight Check icon in FIG. 8, GCS 600 may prompt a preflight check UI for displaying statuses of UAV 100, as shown in FIG. 14. GCS 600 may be configured to display whether data link is workable, whether a sensor is workable, whether a voltage of UAV 100 is at a reasonable voltage, whether a recorder on UAV 100 is workable, whether a GPS receiver on UAV 100 is workable, whether GCS 600 is workable, and whether a home point has been set by a set of light icons 1400. The user may understand statuses of these components of UAV 100 before launching in a quick and easy way. When all light icons 1400 are lighted, UAV 100 is ready to launch.

Figure 15:
FIG. 15 is a schematic diagram of an exemplary user interface of a GCS for setting a home point or a landing point, according to some embodiments of the present disclosure.

FIG. 15 is a schematic diagram of an exemplary user interface of exemplary GCS 600 for setting a home point or a landing point, according to some embodiments of the present disclosure. For example, the user may click on the Home Point icon to select a home point, as shown in FIG. 15. The user can look at the map display on the UI and double clicks on one point to set up the home point for UAV 100. The user may also click on the Landing Point icon to prepare to select a landing point, as shown in FIG. 15. The user can look at the map display on the UI and double clicks on one point to set up a landing point for UAV 100, as shown in FIG. 15.

FIG. 15 also illustrates a route connecting multiple points that GCS 600 receives from the user in a mission mode. After UAV 100 completes the route in the mission mode, processor 620 is configured to executes the instructions to cause GCS 600 to control UAV 100 to fly to the home point shown in FIG. 15.

Figure 16:
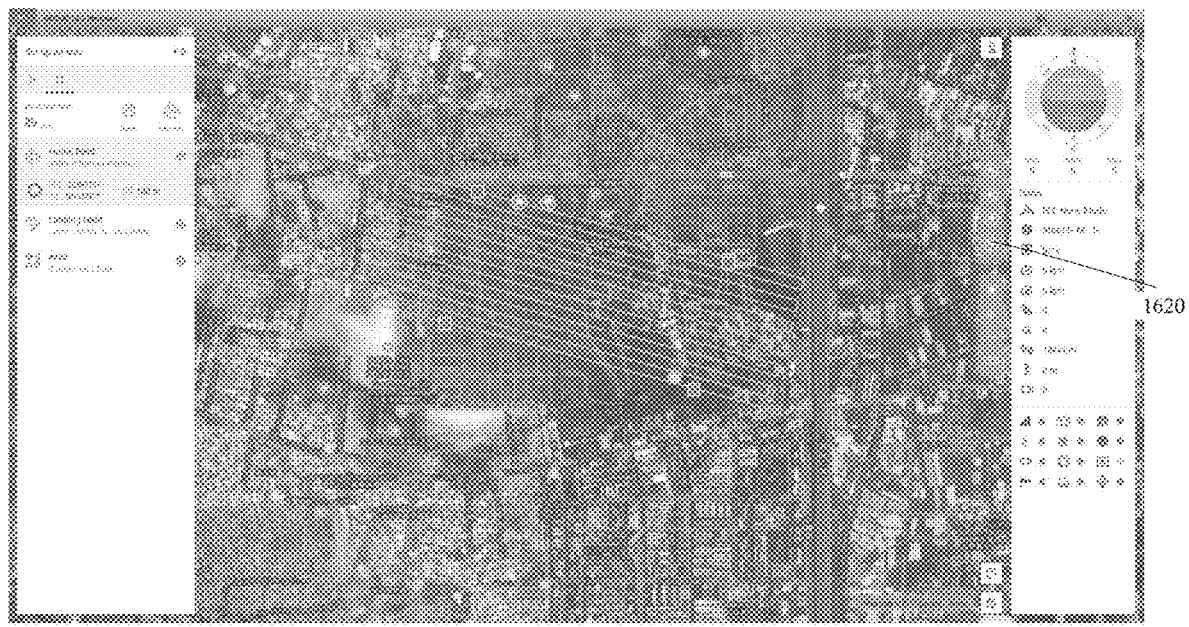
FIG. 16 is a schematic diagram of an exemplary user interface of a GCS for setting a home point and a landing point, according to some embodiments of the present disclosure.

FIG. 16 is a schematic diagram of an exemplary user interface of exemplary GCS 600 for setting a home point and a landing point, according to some embodiments of the present disclosure. Similar to above examples in FIG. 15, the user may select a home point or a landing point after setting up an area for a flight mission. In some embodiments, the user may click a parachute icon 1620, as shown in FIG. 16, to command UAV 100 to open parachute 160 immediately for landing. GCS 600 is configured to send UAV 100 a signal to open parachute 160. After UAV 100 receives the signal, FCC 122 is configured to open parachute 160 of UAV 100 accordingly.

FIG. 16 also illustrates a plurality of route over an area in an auto-photo mode of UAV 100. After the user selects and identifies the area on GCS 600, processor 620 is configured to execute the instructions to cause GCS 600 to plan the plurality of routes for UAV 100 to take photographs over the area.

Another aspect of the disclosure is directed to a non-transitory computer-readable medium storing a set of instructions that are executable by one or more processors of an apparatus to cause the apparatus to perform a method for UAV parachute landing, as discussed above. The computer-readable medium may include volatile or non-volatile, magnetic, semiconductor, tape, optical, removable, non-removable, or other types of computer-readable medium or computer-readable storage devices. For example, the computer-readable medium may be the storage device or the memory module having the computer instructions stored thereon, as disclosed. In some embodiments, the computer-readable medium may be a disc or a flash drive having the computer instructions stored thereon.

It will be appreciated that the present disclosure is not limited to the exact construction that has been described above and illustrated in the accompanying drawings, and that various modifications and changes can be made without departing from the scope thereof. It is intended that the scope of the application should only be limited by the appended claims.

What is claimed is:

1. A system for unmanned aerial vehicle (UAV) parachute landing, the system comprising:
  a memory storing instructions;
  a processor configured to execute the instructions to cause the system to:
    determine whether to open a parachute of the UAV in accordance with a criterion; and
    responsive to a determination to open the parachute of the UAV:
      stop a motor of the UAV that spins a propeller of the UAV,
      wait for a specific period after stopping the motor, and
      open the parachute of the UAV; and
  a detector configured to detect wind direction;
  wherein the processor is configured to execute the instructions to cause the system to stop the motor of the UAV when the UAV flies against wind.

2. The system of claim 1, further comprising:
  a detector configured to detect at least one of a position, a height, or a voltage of the UAV;
  wherein the specific period is a first specific period, the criterion being one of following criteria:
    the UAV arrives at a predetermined landing position and a predetermined landing height;
    the voltage of a UAV is equal to or lower than a predetermined voltage;
    the UAV does not receive a signal of a Globe Positioning System (GPS) for a second specific period; or
    the UAV flies around an area for a third specific period.

3. The system of claim 2, wherein the processor is configured to execute the instructions to cause the system to determine that the criterion that the UAV arrives at the predetermined landing position and the predetermined landing height is met by:
  determining whether the UAV passes the predetermined landing position at the predetermined landing height;
  responsive to a determination that the UAV passes the predetermined landing position at the predetermined landing height, opening the parachute of the UAV; and
  responsive to a determination that the UAV does not pass the predetermined landing position at the predetermined landing height, controlling the UAV to fly around the predetermined landing position to re-enter the predetermined landing position at the predetermined landing height.

4. The system of claim 3, wherein
  the UAV flies around the predetermined landing position in a circle, and
  the predetermined landing position falls on a circumference of the circle, or falls at a center of the circle.

5. The system of claim 1, wherein responsive to the determination to open the parachute of the UAV, the processor is configured to execute the instructions to cause the system to stop the motor of the UAV that spins the propeller of the UAV by:
  determining to stop the motor of the UAV at a position in accordance with the wind direction and the wind speed; and
  stopping the motor of the UAV.

6. The system of claim 1, wherein the processor is configured to execute the instructions to cause the system to:
  brake the propeller of the UAV after stopping the motor of the UAV that spins the propeller of the UAV.

7. The system of claim 1, further comprising:
  a detector configured to detect height;
  wherein responsive to the determination to open the parachute of the UAV, the processor is configured to execute the instructions to cause the system to:
    reduce a height of the UAV to a predetermined landing height before stopping the motor of the UAV at the predetermined landing height.

8. The system of claim 1, further comprising:
  a detector configured to detect at least one of position or height;
  wherein the processor is configured to execute the instructions to cause the system to receive at least one of:
    a home position of the UAV;
    a predetermined landing position of the UAV;
    a predetermined landing height of the UAV;
    a radius of a first circle where the home position falls at a center of the first circle; or
    a radius of a second circle where the predetermined landing position falls on a circumference of the second circle.

9. The system of claim 8, wherein the specific period is a first specific period, and wherein when the UAV ceases to receive a signal of data link from a ground control system for a second specific period in a mission mode, the UAV flies to the home position.

10. The system of claim 1, wherein the specific period is 0.5 or 1 second.

11. A non-transitory computer-readable medium storing instructions that are executable by one or more processors of an apparatus to cause the apparatus to perform operations for unmanned aerial vehicle (UAV) parachute landing, the operations comprising:
  determining whether to open a parachute of the UAV in accordance with a criterion;
  responsive to a determination to open the parachute of the UAV:
    stopping a motor of the UAV that spins a propeller of the UAV, waiting for a specific period after stopping the motor, and opening the parachute of the UAV; and
  detecting wind direction and causing the motor of the UAV to stop when the UAV flies against wind.

12. The non-transitory computer-readable medium of claim 11, wherein the specific period is a first specific period, the criterion being one of following criteria:
  the UAV arrives at a predetermined landing position and a predetermined landing height;
  a voltage of a UAV is equal to or lower than a predetermined voltage;
  the UAV ceases to receive a signal of a Globe Positioning System (GPS) for a second specific period; or
  the UAV flies around an area for a third specific period.

13. The non-transitory computer-readable medium of claim 12, wherein the criterion that the UAV arrives at the predetermined landing position is met when the UAV flies to a position within a distance of the predetermined landing position at the predetermined landing height.

14. The non-transitory computer-readable medium of claim 13, wherein determining the criterion that the UAV arrives at the predetermined landing position and the predetermined landing height is met comprises:
determining whether the UAV passes the predetermined landing position at the predetermined landing height;
responsive to a determination that the UAV passes the predetermined landing position at the predetermined landing height, opening the parachute of the UAV; and
responsive to a determination that the UAV does not pass the predetermined landing position at the predetermined landing height, controlling the UAV to fly around the predetermined landing position to re-enter the predetermined landing position at the predetermined landing height.

15. The non-transitory computer-readable medium of claim 11, wherein responsive to the determination to open the parachute of the UAV, stopping the motor of the UAV that spins the propeller of the UAV includes:
determining to stop the motor of the UAV at a position in accordance with a wind direction and a wind speed; and
stopping the motor of the UAV.

16. The non-transitory computer-readable medium of claim 11, wherein stopping the motor of the UAV that spins the propeller of the UAV further includes:
braking the propeller of the UAV.

17. The non-transitory computer-readable medium of claim 11, wherein the specific period is 0.5 or 1 second.

18. A method for unmanned aerial vehicle (UAV) parachute landing, the method comprising:
determining whether to open a parachute of the UAV in accordance with a criterion; and
responsive to a determination to open the parachute of the UAV:
stopping a motor of the UAV that spins a propeller of the UAV,
waiting for a specific period after stopping the motor, and
opening the parachute of the UAV
detecting wind direction and causing the motor of the UAV to stop when the UAV flies against wind.

19. The method of claim 18, wherein the specific period is 0.5 or 1 second.

* * * * *